United States Patent
Fu

(10) Patent No.: US 8,826,056 B2
(45) Date of Patent: Sep. 2, 2014

(54) CIRCUIT PROTECTION SYSTEM AND METHOD

(75) Inventor: Ying-Bin Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/285,026

(22) Filed: Oct. 31, 2011

(65) Prior Publication Data
US 2012/0311367 A1    Dec. 6, 2012

(30) Foreign Application Priority Data
May 30, 2011    (CN) .......................... 2011 1 0141786

(51) Int. Cl.
G06F 1/00    (2006.01)

(52) U.S. Cl.
USPC .......................................... 713/340; 713/300

(58) Field of Classification Search
USPC ................................................ 713/300–344
See application file for complete search history.

(56) References Cited

U.S. PATENT DOCUMENTS 8,255,988 B2 *    8/2012    Carpenter ...................... 726/17

* cited by examiner

Primary Examiner — Faisal M Zaman
Assistant Examiner — Kim Huynh
(74) Attorney, Agent, or Firm — Novak Druce Connolly Bove + Quigg LLP

(57) ABSTRACT

A circuit protection system for an electronic system includes a platform control hub (PCH), a PCH power chip connected to the PCH, a basic input output system (BIOS), a control unit, and a power supply. The control unit determines the potential of a PW_OK signal from the PCH power chip to get the current state of the electronic system through the BIOS, thereby determining whether the current status of the PW_OK signal corresponds to a predetermined status of the PCH power chip which is defined in the current state of the electronic system. If the current status of the PW_OK signal does not correspond to the predetermined status, the control unit outputs a system PW_OK signal of low potential to disable the PCH power chip, and outputs an enable signal to the PCH which outputs a PS_ON signal of high potential to the power supply to shutdown the electronic system.

9 Claims, 2 Drawing Sheets

CIRCUIT PROTECTION SYSTEM AND METHOD

This application is related to a pending U.S. patent application, with application Ser. No. 13/217,157, entitled "CIRCUIT PROTECTION SYSTEM AND METHOD", and filed on Aug. 24, 2011, which is assigned to the same assignee as the present application.

BACKGROUND

1. Technical Field

The present disclosure relates to circuit protection systems, and particularly to a protection system and a protection method for a circuit utilizing a power chip.

2. Description of Related Art

In a circuit utilizing a power chip, the power chip pulls down the potential of a PW_OK signal output to the main chip when the voltage output by the power chip is excessive or insufficient, to protect the main chip and the power chip. However, there is an interval between receiving the low potential PW_OK signal and disabling the power chip. Since the power chip still works during the interval, the power chip could be damaged or destroyed. Thus, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
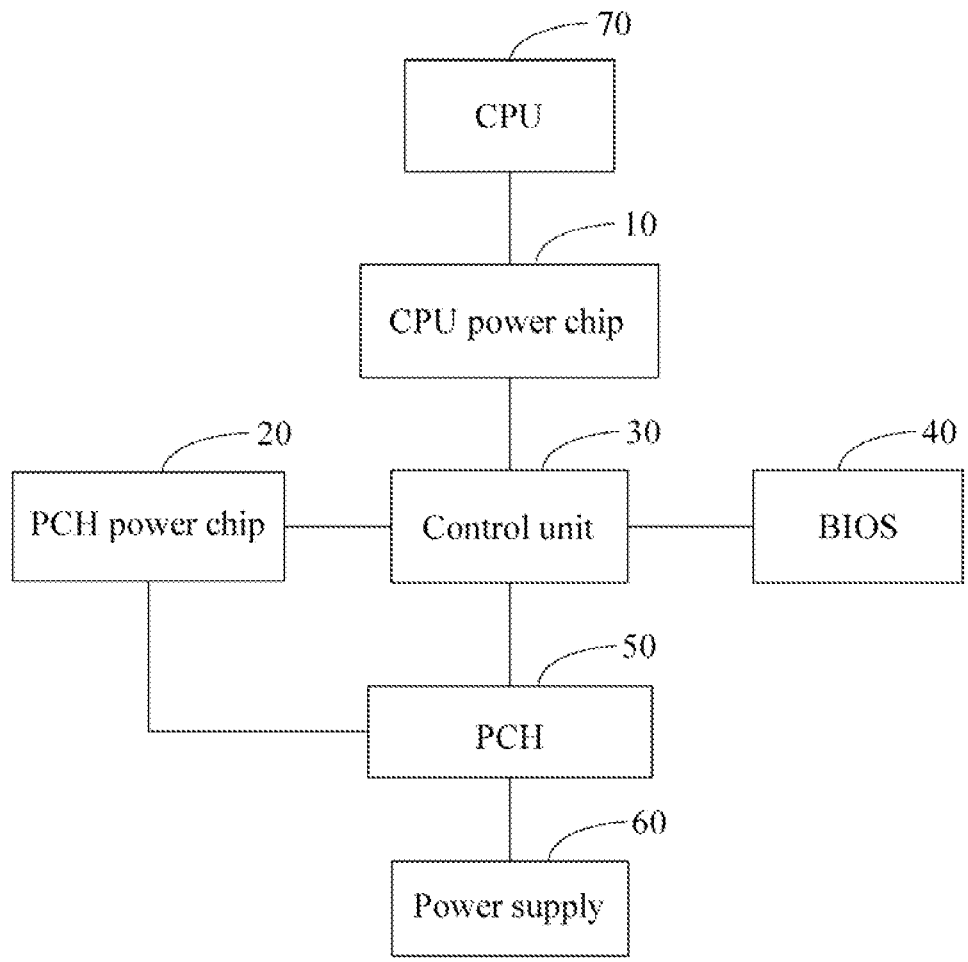
FIG. 1 is a block diagram of an embodiment of a circuit protection system of the present disclosure.

Referring to FIG. 1, an exemplary embodiment of a circuit protection system, which is applied to an electronic system, includes a central processing unit (CPU) 70, a first CPU power chip 10 for powering the CPU 70. A platform controller hub (PCH) 50, a second PCH power chip 20 for powering the PCH 50, a control unit 30, a basic input output system (BIOS) 40, and a power supply 60. The first CPU power chip 10, the second PCH power chip 20, the BIOS 40, and the PCH 50 are all connected to the control unit 30. The power supply 60 is coupled to the PCH 50. The CPU 70, the first CPU power chip 10, the PCH 50, the second PCH power chip 20, and the BIOS 40 are all elements of the electronic system.

The advanced configuration and power interface (ACPI) specification defines six states S0-S5 for an ACPI-compliant computer system. S0 is the working state. S1 is the standby state in which the CPU is disabled while other chips and buses are enabled. S2 is the power standby state in which the CPU and buses are disabled while other chips are enabled. S3 is the suspend to RAM state in which the main memory is powered for storing the content, while other devices are not powered. S4 is the suspend to disk state in which all content of the main memory is saved to hard disk drive. S5 is the shutdown state in which all devices are disabled.

The circuit protection system is ACPI compatible. To correspond to the ACPI specification, the current state of the system has to be stored in the BIOS 40. Hence, the current state of the circuit protection system can be obtained from the BIOS 40.

In this embodiment, the control unit 30 is a complex programmable logic device (CPLD). The control unit 30 detects the PW_OK signals output from the power chips, that is, the first CPU power chip 10 and the second PCH power chip 20, to determine whether the potential of the PW_OK signals output to the main chips, that is, the CPU 70 and the PCH 50, are low, such as logical 0. If any one of the potential of the PW_OK signals of the power chips is low, the control unit 30 gets the current state of the electronic system through the BIOS 40. Thereby, determining whether the status of the potential of the PW_OK signal output from the power chips, that is, the first CPU power chip 10 and the second PCH power chip 20, correspond to the predetermined status, which is defined in each of the current states of the electronic system.

In one embodiment, the potential of the PW_OK signal output from the CPU power chip 10 to the CPU 70, detected by the control unit 30, is low, and the current state of the electronic system obtained by the control unit 30 through the BIOS 20 is S1. Since the CPU 70 should be disabled in state S1 to correspond to the ACPI specification, the first CPU power chip 10 has to output a PW_OK signal of low potential to the CPU 70. Hence, the status of the potential of the PW_OK signal of the first CPU power chip 10 is considered to correspond to the predetermined status for the first CPU power chip 10, defined in the current state of the circuit protection system. In another embodiment, the potential of the PW_OK signal output from the second PCH power chip 20 to the PCH 50 is low, and the current state of the electronic system obtained by the control unit 30 through the BIOS 20 is S1. Since the PCH 50 should be enabled in state S1 to correspond to the ACPI specification, the second PCH power chip 20 has to output a PW_OK signal of high potential, such as logical 1, to the PCH 50. Hence, the status of the potential of the PW_OK signal of the second PCH power chip 20 is not considered to correspond to the predetermined status for the second PCH power chip 20, defined in the current state of the circuit protection system. When inconsistencies within the system cause the second PCH power chip 20 to output an incorrect PW_OK signal, for example, the voltage output by the second PCH power chip 20 is excessive or insufficient. The control unit 30 correspondingly outputs an enable signal of low potential to disable the second PCH power chip 20, and outputs a system PW_OK signal of low potential to the PCH 50. The PCH 50 outputs a PS_ON signal of high potential to the power supply 60 to shut down the electronic system in response to receiving the enable signal of low potential, to avoid further damage caused by excessive or insufficient voltage.

Figure 2:
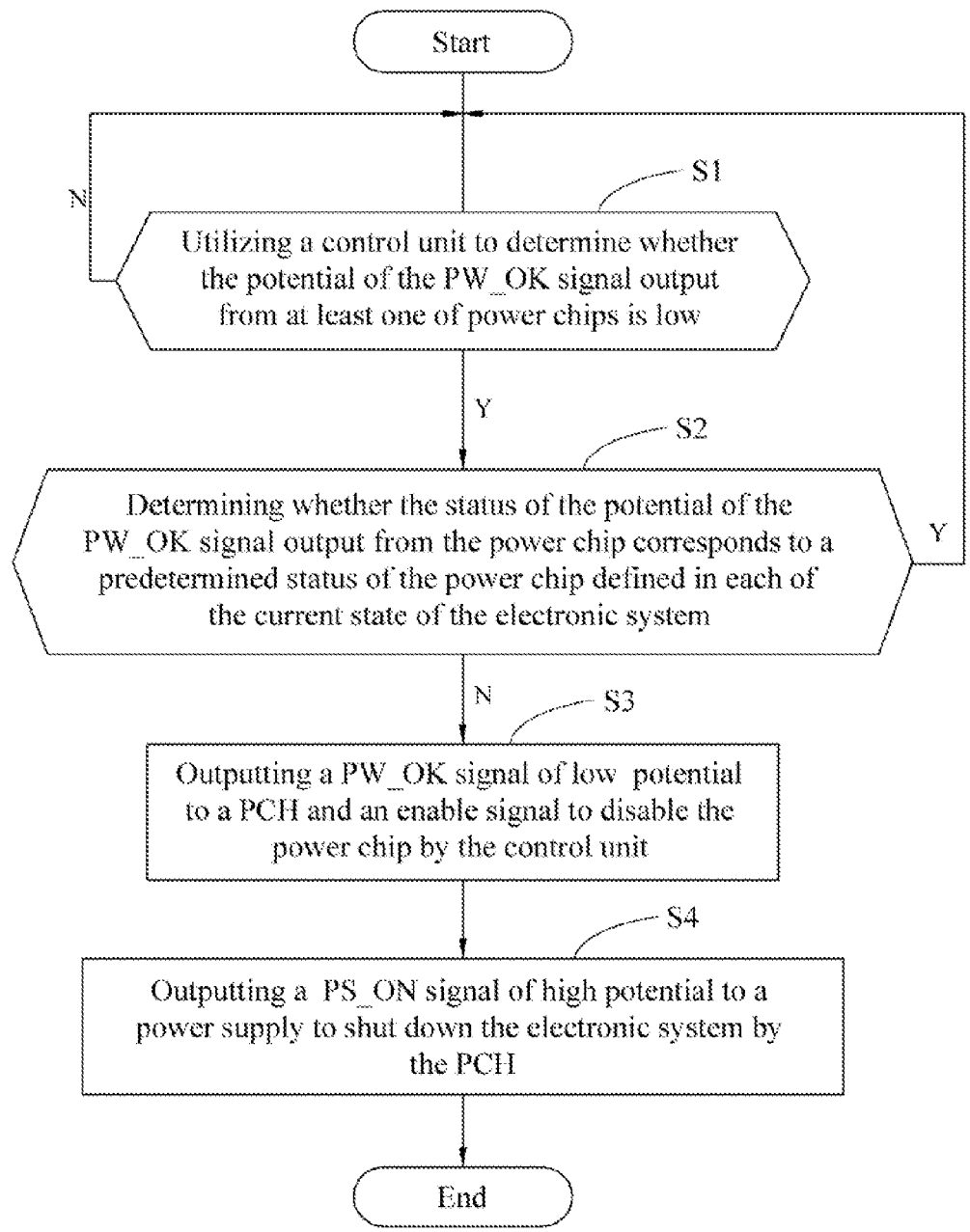
FIG. 2 is a flowchart of an embodiment of a circuit protection method of the present disclosure.

Referring to FIG. 2, the circuit protection method of the present disclosure is as follows. Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

In step S1, the control unit 30 determines whether the potential of the PW_OK signal output from at least one of the power chips 10 and 20 is low. If the potential of the PW_OK signal output by any one of the power chip 10/20 is low, step S2 is implemented; otherwise, step S1 is repeated.

In step S2, the correspondence between the current status of the potential of the PW_OK signal output by the power chip 10/20 and the predetermined status of the power chip 10/20 defined in the current state of the electronic system is determined. The control unit 30 gets the current state of the electronic system through the BIOS 40. Since the potential of the PW_OK signal output by the power chip 10/20 determined in step S1 is low, the corresponding main chip is disabled. If the current status of the PW_OK signal corresponds to the predetermined status of the PW_OK signal of the power chip 10/20 which defined in the current state of the electronic system, return to step S1; otherwise, step S3 is implemented.

In step S3, the control unit 30 outputs an enable signal to disable the power chip 10/20, and a system PW_OK signal of low potential to the PCH 50. In step S2, if the current status of the PW_OK signal of the power chip 10/20 does not correspond to the predetermined status of the power chip 10/20 defined in the current state of the electronic system, there should be problems because the power chip 10/20 outputs the PW_OK signal of low potential. For example, the voltage output by the power chip 10/20 is excessive or insufficient. Correspondingly, the control unit 30 outputs an enable signal of low potential to the power chip 10/20 and the system PW_OK signal of low potential to the PCH 50, thereby disabling the power chip 10/20 to avoid the damage caused by excessive or insufficient voltage.

In step S4, The PCH 50 outputs a PS_ON signal of high potential to the power supply 60. The PCH 50 outputs the PS_ON signal of high potential to the power supply 60 in response to receive a system PW_OK signal of low potential to shut down the electronic system, to avoid other chips working in the abnormal voltage.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A circuit protection system for an electronic system, the circuit protection system comprising:
   a control unit;
   a platform control hub (PCH) connected to the control unit;
   a PCH power chip connected to the control unit and the PCH to power the PCH;
   a basic input output system (BIOS) connected to the control unit; and
   a power supply connected to the PCH;
   wherein the control unit determines the status of the potential of a PW_OK signal output from the PCH power chip, and gets the current state of the electronic system through the BIOS, thereby outputting an enable signal to disable the PCH power chip and outputting a system PW_OK signal to the PCH when the current status of the PW_OK signal of the PCH power chip does not correspond to a predetermined status for the PCH power chip defined in the current state of the electronic system, and the PCH outputs a PS_ON signal to the power supply to shut down the electronic system in response to receiving the system PW_OK signal.

2. The circuit protection system of claim 1, further comprising a main chip and a main power chip connected between the main chip and the control unit to power the main chip, wherein the control unit determines the status of the potential of the PW_OK signal output from the main power chip, and gets the current state of the electronic system through the BIOS, thereby outputting an enable signal to disable the power chip and outputting the system PW_OK signal to the PCH when the current status of the PW_OK signal of the power chip does not correspond to the predetermined status for the power chip defined in the current state of the electronic system, and the PCH outputs the PS_ON signal to the power supply to shut down the electronic system in response to receiving the system PW_OK signal.

3. The circuit protection system of claim 2, wherein the main chip is a central processing unit (CPU), and the power chip is a CPU power chip.

4. The circuit protection system of claim 1, wherein the control unit is a complex programmable logic device (CPLD).

5. The circuit protection system of claim 1, wherein the potential of the system PW_OK signal output by the control unit is low.

6. The circuit protection system of claim 1, wherein the potential of the PS_ON signal output by the PCH is high.

7. The circuit protection system of claim 1, wherein the circuit protection system is advanced configuration and power interface (ACPI) compatible.

8. A circuit protection method for an electronic system, the circuit protection method comprising:
   utilizing a control unit to determine whether the potential of a PW_OK signal output from a platform control hub (PCH) power chip to a PCH is low;
   determining whether the current status of the potential of the PW_OK signal of the PCH power chip corresponds to a predetermined status defined in each of the current states of the electronic system in response to the PW_OK signal of the PCH power chip being low;
   outputting a system PW_OK signal of low potential to the PCH and an enable signal to disable the PCH power chip by the control unit in response to the current status of the potential of the PW_OK signal of the PCH power chip not corresponding to the predetermined status; and
   outputting a PS_ON signal of high potential to a power supply to shut down the electronic system by the PCH in response to receiving the system PW_OK signal of low potential.

9. The circuit protection method of claim 8, wherein the control unit is a complex programmable logic device (CPLD).

* * * * *